(12) United States Patent
Davis et al.

(10) Patent No.: US 8,067,513 B2
(45) Date of Patent: Nov. 29, 2011

(54) STYRENATED PHENOL ETHOXYLATES IN EMULSION POLYMERIZATION

(75) Inventors: Lawrence C. Davis, Spartanburg, SC (US); Edward R. Godwin, Davidson, NC (US); Charles V. Hinton, Greenville, SC (US); James T. Tanner, Greer, SC (US)

(73) Assignee: Ethox Chemicals LLC, Greenville, SC (US)

( * ) Notice: Subject to any disclaimer, the term of this patent is extended or adjusted under 35 U.S.C. 154(b) by 0 days.

(21) Appl. No.: 12/222,480

(22) Filed: Aug. 11, 2008

(65) Prior Publication Data
US 2009/0105383 A1  Apr. 23, 2009

Related U.S. Application Data

(60) Provisional application No. 60/935,402, filed on Aug. 10, 2007.

(51) Int. Cl.
*C08F 2/00* (2006.01)

(52) U.S. Cl. ........ 526/193; 524/700; 524/706; 524/707; 524/710; 524/711; 524/713; 524/714; 524/724; 524/742; 524/747; 524/755; 524/757; 526/89; 526/192; 526/209; 526/222

(58) Field of Classification Search ................. 524/700, 524/710, 713, 747, 755, 757, 714, 724, 742, 524/706, 707, 711, 761, 762; 526/89, 192, 526/193, 209, 222
See application file for complete search history.

(56) References Cited

U.S. PATENT DOCUMENTS

| | | | | | |
|---|---|---|---|---|---|
| 3,896,073 | A | * | 7/1975 | Smith | 524/460 |
| 4,690,788 | A | * | 9/1987 | Yada et al. | 264/494 |
| 5,278,203 | A | * | 1/1994 | Harms | 523/200 |
| 5,545,678 | A | * | 8/1996 | Giencke et al. | 523/404 |
| 6,200,492 | B1 | * | 3/2001 | Eicken et al. | 252/8.81 |
| 6,870,019 | B2 | * | 3/2005 | Kajiwara et al. | 526/225 |
| 2007/0072983 | A1 | * | 3/2007 | Watanabe et al. | 524/459 |

FOREIGN PATENT DOCUMENTS

JP  2006241175 A  *  9/2006

* cited by examiner

*Primary Examiner* — David W Wu
*Assistant Examiner* — Marie Reddick
(74) *Attorney, Agent, or Firm* — Isaac A. Angres

(57) ABSTRACT

The present invention relates to the use of Styrenated Phenol Ethoxylates as surfactants in emulsion polymerization. The present invention further relates to the use of both anionic and nonionic Styrenated Phenol Ethoxylates in emulsion polymerization. Latexes with small average particle and narrow particle size distributions are obtained. Prepared latexes also have low coagulum levels and exhibit excellent mechanical and chemical stability.

4 Claims, No Drawings

STYRENATED PHENOL ETHOXYLATES IN EMULSION POLYMERIZATION

This application claims the priority benefit under 35 U.S.C. section 119 of U.S. Provisional Patent Application No. 60/935,402 entitled "Styrenated Phenol Ethoxylates In Emulsion Polymerization", filed Aug. 10, 2007, which is in its entirety herein incorporated by reference.

FIELD OF THE INVENTION

The present invention relates to emulsion polymerizing ethylenically unsaturated monomers. This invention also relates to emulsion polymerization of ethylenically unsaturated monomers by using styrenated surfactants as the primary emulsifier. The instant invention also relates to a process for the preparation of a polymer dispersion by free radical polymerization of an aqueous monomer emulsion. The present invention further relates to a method for production of waterborne polymer and copolymer dispersions comprising monomer units derived from at least one polymerizable ethylenically unsaturated monomer. The polymer and copolymer dispersions are obtained in a free radical emulsion polymerization process performed in an aqueous media and in the presence of at least one styrenated surfactant In a further aspect the present invention refers to the use of said polymer or copolymer dispersion.

BACKGROUND OF THE INVENTION

Emulsion polymerization is the most important industrial method for manufacture of aqueous dispersion of polymers. Emulsion polymerization is typically performed in an aqueous medium in the presence of a surfactant and a water soluble initiator and is usually rapidly producing high molecular weight homo or copolymers at high solids content and low dispersion viscosity. Its application requires the emulsification of the monomer in a medium, usually water, through the use of emulsifiers. These are supplied in addition to the other ingredients that go into most polymerizations, such as the initiator and chain transfer agents. The use and type of emulsifier determines many of the characteristics of the produced polymer or copolymer, which is typically a latex (stable colloidal suspension of polymer particles in a continuous phase, usually water). Moreover, the emulsifier usually cannot be completely removed from the latex. For this reason, and because of the great unpredictability of the efficacy of a given surface-active agent as an emulsifier in polymerization, many compounds that would theoretically be useful are not.

It is also known that emulsion polymerization requires the use of a surfactant to form a stable emulsion of monomers and to prevent coagulation of the product polymer. Surfactants are generally categorized into two types: either non-polymerizable, or polymerizable, that is co-polymerizable with the monomers for polymer formation. A problem which has arisen with the use of non-polymerizable surfactants is that they remain as a residue in the product polymer and, as they can be extracted by water, they make the product sensitive to water. Surfactants are also categorized as anionic, cationic, non-ionic or zwitterionic depending on their chemical makeup.

With the customary emulsion polymerization processes, suitable latices have been difficult to obtain since the latices usually contain particles of varying size and are either too fine or too large. Various proposals have heretofore been made to overcome these difficulties but not with the ultimate success desired. For example, the use of various different emulsifiers and catalysts have been proposed. Also, varying the conditions of polymerization has been suggested. However, in most of these cases, too much coagulation occurred with the resulting latex containing too much coagulum or partially agglomerated particles which precipitate reducing the yield. Further, the shelf life of such latices leave much to be desired. It is desirable to have latices which change very little during storage with respect to viscosity and have and maintain good heat stability.

The final product resulting from emulsion polymerization is normally an opaque, grey or milky-white dispersion of high molecular weight polymer(s) at a solids content of typically 30-60% in water. Said dispersion typically comprises acrylic, methacrylic and crotonic acid homo and copolymers, methacrylate and acrylate ester homo or copolymers, vinyl acetate homo or copolymers, vinyl and vinylidene chloride homo or copolymers, ethylene homo or copolymers, styrene and butadiene homo or copolymers, acrylamide homo or copolymers, butadiene-acrylonitrile copolymers, styrene-acrolein copolymers and/or where applicable carboxylated versions. Traditional applications for such aqueous dispersions are adhesives, binders for fibres and particulate matter, protective and decorative coatings, dipped goods, foam, paper coatings, backings for carpet and upholstery, modifiers for bitumens and concrete and thread and textile modifiers. More recent applications include biomedical applications as protein immobilisers, visual detectors in immunoassays, as release agents, in electronic applications as photoresists for circuit boards, in batteries, conductive paint, copy machines and as key components in molecular electronic devices.

Ethoxylated Styrenated Phenols have been widely disclosed as effective and efficient pigment dispersants in a variety of applications. U.S. Pat. No. 6,736,892 (2004) discloses anionic Sytrenated Phenol Ethoxylates as pigment dispersants in water based ink and coating applications. U.S. application 0235877 A1 (2005) discloses fatty acid esters of Styrenated Phenol Alkoxylates as effective and efficient pigment dispersants for solvent based systems. U.S. Pat. No. 5,035,785 (1991) discloses nonionic Styrenated Phenol Ethoxylates as effective and efficient pigment dispersants in electrodeposition baths. The dispersants were also found to increase film build and dramatically improve film appearance and maintain the improved film appearance in this application. Thus the utility of Styrenated Phenol Ethoxylates, both anionic and nonionic, in separating and stabilizing pigment particles against aggregation has been well known and demonstrated in both aqueous and non-aqueous systems. In these applications, these surfactants are added as part of the formulation comprising the resin used as a binder or film former, the pigment paste or dispersion, and other additives such as coalescing aids, viscosity modifiers, and other additives well known to those familiar with the art.

In emulsion polymerization of ethylenically unsaturated monomers, it is well known to those familiar with the art that surfactants are necessary and essential ingredients required for the polymerization reaction to occur in the aqueous phase. It is also well known to those familiar with the art that surfactants further function by stabilizing the latex particles against aggregation from shear or mechanical force and also stabilize the latex particles from aggregation due to the addition of electrolyte to the latex. In the emulsion polymerization process, since the radical polymerization takes place inside the surfactant formed micelles, the surfactants in emulsion polymerization are essential components in the manufacture of the latex. Benjamin B. Kline and George H. Redlich, "The Role of Surfactants in Emulsion Polymerization", *Surfactant Science Series*, 26, 1988) It is also well known to those skilled in the art that the selection of surfactant type and level is also the determining factor in many emulsion properties, in particular the particle size of the latex particles. Low particle size is highly desirable in pigmentation and results in higher gloss in the final film or coating.

We have now found that the Styrenated Phenol Ethoxylates are useful as surfactants in the emulsion polymerization of ethylenically unsaturated monomers. The use of both anionic and nonionic Styrenated Phenol Ethoxylates in the emulsion polymerization process provides latexes with small particle size and small particle size distributions. Furthermore, latexes prepared using Styrenated Phenol Ethoxylates have excellent mechanical and chemical stability. The Styrenated Phenol Ethoxylates of the present invention may also be used in combination with conventional surfactants to improve latex properties.

SUMMARY OF THE INVENTION

The present invention provides a process for the emulsion polymerization of at least one ethylenically unsaturated monomer containing at least one carbon-to-carbon double bond, said process comprising polymerizing said ethylenically unsaturated monomer in an aqueous medium in the presence of a water-soluble initiator and a surfactant of the formula:

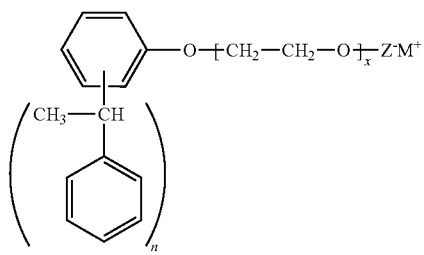

(I)

wherein n =1, 2 or 3; x is 1-100; $Z^-$ is selected from the group consisting of $SO_3^-$ or $PO_3^{2-}$; and $M^+$ is selected from the group consisting of $Na^+$, $K^{30}$, $NH_4^+$, and an alkanolamine.

The present invention also provides a process for the emulsion polymerization of at least one ethylenically unsaturated monomer containing at least one carbon-to-carbon double bond, said process comprising polymerizing said ethylenically unsaturated monomer in an aqueous medium in the presence of a a water-soluble initiator and a surfactant of the formula:

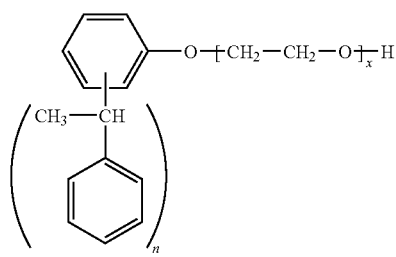

(II)

wherein n=1, 2 or 3; x is preferably 1-100.

The instant invention further provides a process for the emulsion polymerization of at least one ethylenically unsaturated monomer containing at least one carbon-to-carbon double bond, said process comprising polymerizing said ethylenically unsaturated monomer in an aqueous medium in the presence of a water-soluble initiator and a mixture of surfactants of the formula I and II:

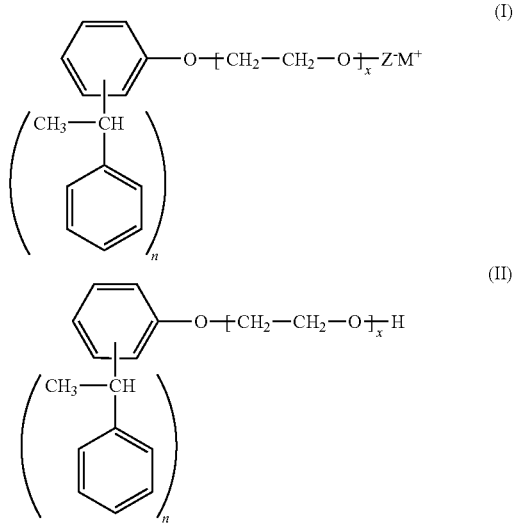

wherein n=1, 2, 3; x is preferably 1-100; Z can be either $SO_3^-$ or $PO_3^{2-}$, and $M^+$ is $Na^+$, $K^+$, $NH_4^+$, or an alkanolamine.

DETAILED DESCRIPTION OF THE INVENTION

The present invention is directed towards the emulsion polymerization of ethylenically unsaturated monomers in the presence of a anionic surfactant of formula (I)

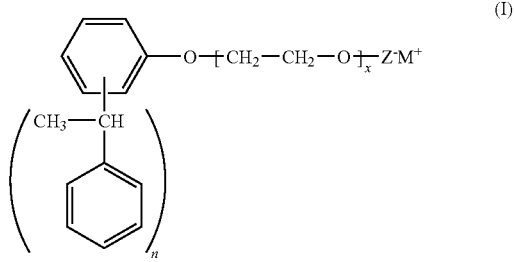

where n=1, 2, 3; x is preferably 1-100, more preferably from about 5 to 60, and most preferably from about 5 to 40; Z can be either $SO_3^-$ or $PO_3^{2-}$, and $M^+$ is $Na^+$, $K^+$, $NH_4^+$, or an alkanolamine.

The present invention is further directed towards the emulsion polymerization of ethylenically unsaturated monomers in the presence of a nonionic surfactant of formula (II)

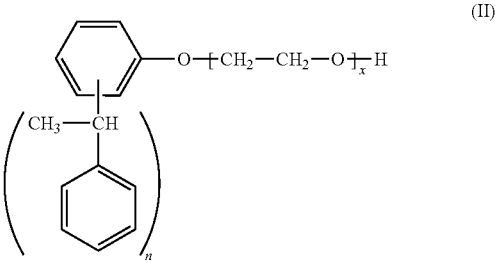

where n=1, 2, 3; X is preferably 1-100. more preferably from about 5 to 60, and most preferably from about 5 to 40.

The compounds of formulas (I) and (II) may be used separately or in combination in the emulsion polymerization. More commonly they are used in combination. When used in combination, the ratio of compounds of formula (I) to compounds of formula (II) is not limited but is dictated by the desired emulsion properties. Surfactants of formulas (I) and (II) may also be used in combination with other surfactants that are commonly used in the art When used in combination, the ratio of surfactants is not specific but is commonly optimized based on the nature of the ethylenically unsaturated monomers present in a given formulation. The total amount of surfactants of formulas (I) and formula (II) that may be used in the present invention is preferably from about 0.1% to about 20% based on total weight of the monomer, more preferably from about 0.2% to about 10%, and most preferably from about 0.5% to about 7% based on the total weight of the monomer. The compounds of formulas (I) and (II) may also be used in combination with conventional surfactants in order to improve emulsion properties.

Surfactants that are commonly used in the emulsion polymerization process include both anionic and nonionic molecules. Commonly utilized anionic surfactants in the emulsion polymerization process include sodium alkylbenzene sulfonates, alkyldiphenyloxide disulfonates, ethoxylated alkylphenol sulfates and phosphates, alkyl sulfosuccinates, and sulfates and phosphates of fatty alcohols, etc. Commonly utilized nonionic surfactants include linear and branched alcohol ethoxylates, and alkylphenol ethoxylates, particularly octylphenol ethoxylates. When used in combination with other surfactants the ratios are not limited but are also dictated by the desired emulsion properties.

Suitable monomers that may be polymerized by the practice of the present invention include numerous ethylenically unsaturated monomers such as vinyl monomers or acrylic monomers. Typical vinyl monomers suitable for use in accordance with the present invention include, but are not limited to, vinyl esters such as vinyl acetate, vinyl propionate, vinyl benzoate, etc; vinyl aromatic hydrocarbons such as styrene, methyl styrenes, other vinyl aromatics such as vinyl toluenes, vinyl napthalenes, divinyl benzene, etc. Halogenated vinyl monomers such as vinyl chloride, vinylidene chloride, etc. may also be used.

Suitable acrylic monomers which may be used in accordance with the present invention comprise compounds with acrylic functionality such as alkyl acrylates and methacrylates, acrylate acids and methacrylate acids as well as acrylamides and acrylonitrile. Typical acrylic monomers include, but are not limited to methyl acrylate and methyl methacrylate, ethyl, propyl, and butyl acrylate and methacrylate, benzyl acrylate and methacrylate, cyclohexyl acrylate and methacrylate, decyl and dodecyl acrylate and methacrylate, etc. Other typical acrylic monomers include hydroxy alkyl acrylates and methacrylates such as hydroxypropyl and hydroxyethyl acrylate and methacrylate, acrylic acids such as methacrylic and acrylic acid, and amino acrylates and methacrylates. It will be recognized by those familiar with the art that other unsaturated monomers which are suitable for free radical addition polymerization may also be used in accordance with the present invention.

Numerous free radical forming compounds are utilized as catalysts in the emulsion polymerization process. Typically compounds used as catalysts are those that from free radicals via thermal decomposition, referred to in the art as "thermal initiators" or combinations of compounds that form free radicals via oxidation/reduction reactions. Such catalysts are combinations of an oxidizing agent and a reducing agent and are commonly referred to in the art as "redox initiators." Either thermal or redox catalysts may be used in the practice of the present invention.

Typical catalysts utilized as thermal initiators include persulfates, specifically potassium persulfate, sodium persulfate, ammonium persulfate and the like. Typical redox initiators include combinations of oxidizing agents or initiators such as peroxides, specifically benzoyl peroxide, t-butyl hydroperoxide, lauryl peroxide, hydrogen peroxide, 2,2'-diazobisisobutyronitrile, and the like. Typical reducing agents include sodium bisulfite, sodium formaldehyde sulfoxylate, sodium hydrosulfite, and ascorbic and isoascorbic acid. The catalyst or initiator is employed in an amount preferably from 0.1 to 3 weight percent of the total monomer weight, and most preferably from about 0.1 to 1 weight percent of the total monomer charge.

Other additives or components which are known to those skilled in the art may also used in accordance with the present invention. These include chain transfer agents, which are used to control molecular weight, additives to adjust pH, and compounds utilized as protective colloids which provide additional stability to the latex particles.

Any of the conventional methods employed in the emulsion polymerization process may also be used in accordance with the present invention. These include both standard and pre-emulsion monomer addition techniques as well as staged monomer addition.

EXAMPLES

The following examples and comparative examples are intended to illustrate the usefulness of the invention and are not to be construed as limiting or defining the entire scope of the invention in any way.

All reactions were carried out in a 1500 mL glass reactor equipped with a four-blade stainless steel agitator, nitrogen gas inlet, thermocouple connected to a digital temperature controller, reflux condenser, and inlets for the addition of monomer mixture and catalyst solutions. Emulsion viscosities were measured using a Brookfield LVT Viscometer using a # 2 spindle at 30 rpm. Particle size measurements were run on a Brookhaven 90Plus Particle Size Analyzer.

The Styrenated Phenol Ethoxylates of the present invention will be referred to in an abbreviated fashion. For example, the Sodium Sulfate salt of Distyrenated Phenol containing 20 moles of ethylene oxide will be referred to as DSP (POE 20) Sodium Sulfate, etc. Rhodacal® DS-4, Abex® JKB, and Abex® EP-120 are registered trademarks of Rhodia corporation. Triton® X-405 is a registered trademark of Dow Corporation.

Example 1

687.0 grams of deionized water, 33.0 grams of a 50 percent solution of DSP (POE 20) Sodium Sulfate, and 15.0 grams of DSP (POE 40) were added to the reaction kettle and agitation was commenced. Oxygen was removed from the solution by nitrogen sparge and the solution was heated to 65° C. Next a monomer mixture of 333.0 g methyl methacrylate, 333.0 g of butyl acrylate and 6.0 g of methacrylic acid was prepared. 67.0 g (10%) of the monomer mixture was charged to the reaction kettle. A catalyst solution consisting of 5.0 g potassium persulfate in 100.0 g deionized water was then prepared, and 10% of the catalyst solution was then charged to the reaction kettle. A trace of ferrous sulfate was then added. The reaction mixture exothermed to 70-75° C. The remaining monomer mixture and catalyst solution were then metered in to the reaction kettle over a period of two hours. During the addition, the temperature of the reaction was maintained between 70-75° C. After the addition of monomer and catalyst was complete, the reaction mixture was held at 70-75° C. for an additional 30 minutes. The reaction mixture was then cooled to 40° C. and 4 grams of ammonium hydroxide in 20 mL deionized water was added slowly to the reaction kettle. After stirring for an additional 15 minutes, the emulsion was filtered through a 150 micron filter bag. The emulsion properties are shown in Table 1.

TABLE 1

| Emulsion | Properties |
| --- | --- |
| Solids | 46.2 |
| pH | 8.7 |
| Coagulum | <0.05% |
| Viscosity (centipoise) | 430 |
| Mean Particle Size (nm) | 112.9 |
| Polydispersity Index | 0.124 |
| Mechanical Stability | Good |
| Chemical Stability* | Good |

*1M $CaCl_2$

Comparative Example 1

687.0 grams of deionized water, 72.0 grams of a 22% solution of Sodium Doceylbenzene Sulfonate (Rhodacal® DS-4), and 18.7 grams of an 80% solution of Octylphenol (POE 40) (Triton® X-405) were added to the reaction kettle and agitation was commenced. Oxygen was removed from the solution by nitrogen sparge and the solution was heated to 65° C. Next a monomer mixture of 333.0 g methyl methacrylate, 333.0 g of butyl acrylate and 6.0 g of methacrylic acid was prepared. 67.0 g (10%) of the monomer mixture was charged to the reaction kettle. A catalyst solution consisting of 5.0 g potassium persulfate in 100.0 g deionized water was then prepared and 10% of the catalyst solution was then charged to the reaction kettle. A trace of ferrous sulfate was then added. The reaction mixture exothermed to 70-75° C. The remaining monomer mixture and catalyst solution were then metered in to the reaction kettle over a period of two hours. During the addition, the temperature of the reaction was maintained between 70-75° C. After the addition of monomer and catalyst was complete, the reaction mixture was held at 70-75° C. for an additional 30 minutes. The reaction mixture was then cooled to 40° C. and 4 grams of ammonium hydroxide in 20 mL deionized water was added slowly to the reaction kettle. After stirring for an additional 15 minutes, the emulsion was filtered through a 150 micron filter bag. The emulsion properties are shown in Table 2.

TABLE 2

| Emulsion | Properties |
| --- | --- |
| Solids | 46.0 |
| pH | 8.5 |
| Coagulum | 0.1% |
| Viscosity (centipoise) | 55 |
| Mean Particle Size (nm) | 220.0 |
| Polydispersity Index | 0.309 |
| Mechanical Stability | Good |
| Chemical Stability* | Poor |

*1M $CaCl_2$

Example 2

687.0 grams of deionized water, 72.0 grams of a 22% solution of Sodium Doceylbenzene Sulfonate (Rhodacal® DS-4), and 15.0 grams of DSP (POE 40) were added to the reaction kettle and agitation was commenced. Oxygen was removed from the solution by nitrogen sparge and the solution was heated to 65° C. Next a monomer mixture of 333.0 g methyl methacrylate, 333.0 g of butyl acrylate and 6.0 g of methacrylic acid was prepared. 67.0 g (10%) of the monomer mixture was charged to the reaction kettle. A catalyst solution consisting of 5.0 g potassium persulfate in 100.0 g deionized water was then prepared and 10% of the catalyst solution was then charged to the reaction kettle. A trace of ferrous sulfate was then added. The reaction mixture exothermed to 70-75° C. The remaining monomer mixture and catalyst solution were then metered in to the reaction kettle over a period of two hours. During the addition, the temperature of the reaction was maintained between 70-75° C. After the addition of monomer and catalyst was complete, the reaction mixture was held at 70-75° C. for an additional 30 minutes. The reaction mixture was then cooled to 40° C. and 4 grams of ammonium hydroxide in 20 mL deionized water was added slowly to the reaction kettle. After stirring for an additional 15 minutes, the emulsion was filtered through a 150 micron filter bag. The emulsion properties are shown in Table 3.

TABLE 3

| Emulsion | Properties |
| --- | --- |
| Solids | 46.0 |
| pH | 8.3 |
| Coagulum | <0.1% |
| Viscosity (centipoise) | 240 |
| Mean Particle Size (nm) | 105.0 |
| Polydispersity Index | 0.166 |
| Mechanical Stability | Good |
| Chemical Stability* | Moderate |

*1M $CaCl_2$

The properties of the emulsions in the above examples demonstrate the usefulness of the present invention. The combination of the Styrenated Phenol anionic and nonionic surfactants in example 1 yielded an emulsion with significantly lower particle size than the emulsion prepared from sodium doceylbenzene sulfonate and ethoxylated octylphenol in comparative example 1. Furthermore, the replacement of the standard nonionic surfactant, ethoxylated octylphenol, with DSP (POE 40) in example 2 yielded an emulsion with significantly lower particle size and particle size distribution.

Example 3

687.0 grams of deionized water, 24.0 grams of a 50 percent solution of DSP (POE 20) Sodium Sulfate, and 7.9 grams of DSP (POE 40) were added to the reaction kettle and agitation was commenced. Oxygen was removed from the solution by nitrogen sparge and the solution was heated to 65° C. Next a monomer mixture of 288.0 g styrene, 210.0 g of ethyl acrylate and 26.0 g of methacrylic acid was prepared. 52.4 g (10%) of the monomer mixture was charged to the reaction kettle. A catalyst solution consisting of 5.0 g potassium persulfate in 100.0 g deionized water was then prepared and 10% of the catalyst solution was then charged to the reaction kettle. A trace of ferrous sulfate was then added. The reaction mixture exothermed to 70-75° C. The remaining monomer mixture and catalyst solution were then metered in to the reaction kettle over a period of four hours. During the addition, the temperature of the reaction was maintained at 80° C. After the addition of monomer and catalyst was complete, the reaction mixture was held at 80° C. for an additional 30 minutes. The reaction mixture was then cooled to 40° C. and 8 grams of ammonium hydroxide in 20 mL deionized water was added slowly to the reaction kettle. After stirring for an additional 15 minutes, the emulsion was filtered through a 150 micron filter bag. The emulsion properties are shown in Table 4.

TABLE 4

| Emulsion | Properties |
|---|---|
| Solids | 39.0 |
| pH | 8.8 |
| Coagulum | <0.2% |
| Viscosity (centipoise) | 26 |
| Mean Particle Size (nm) | 108.8 |
| Polydispersity Index | 0.205 |
| Mechanical Stability | Good |
| Chemical Stability* | Good |

*1M CaCl$_2$

Comparative Example 2

687.0 grams of deionized water, 40.0 grams of a 30% solution of C10-C12 fatty alcohol (POE 15) Ammonium Sulfate (Abex® JKB), and 9.8 grams of an 80% solution of Octylphenol (POE 40) (Triton® X-405) were added to the reaction kettle and agitation was commenced. Oxygen was removed from the solution by nitrogen sparge and the solution was heated to 65° C. Next a monomer mixture of 288.0 g styrene, 210.0 g of ethyl acrylate and 26.0 g of methacrylic acid was prepared. 52.4 g (10%) of the monomer mixture was charged to the reaction kettle. A catalyst solution consisting of 5.0 g potassium persulfate in 100.0 g deionized water was then prepared and 10% of the catalyst solution was then charged to the reaction kettle. A trace of ferrous sulfate was then added. The reaction mixture exothermed to 70-75° C. The remaining monomer mixture and catalyst solution were then metered in to the reaction kettle over a period of four hours. During the addition, the temperature of the reaction was maintained at 80° C. After the addition of monomer and catalyst was complete, the reaction mixture was held at 80° C. for an additional 30 minutes. The reaction mixture was then cooled to 40° C. and 8 grams of ammonium hydroxide in 20 mL deionized water was added slowly to the reaction kettle. After stirring for an additional 15 minutes, the emulsion was filtered through a 150 micron filter bag. The emulsion properties are shown in Table 5.

TABLE 5

| Emulsion | Properties |
|---|---|
| Solids | 39.2 |
| pH | 8.6 |
| Coagulum | <0.2% |
| Viscosity (centipoise) | 14 |
| Mean Particle Size (nm) | 127.7 |
| Polydispersity Index | 0.254 |
| Mechanical Stability | Good |
| Chemical Stability* | Good |

*1M CaCl$_2$

Example 4

687.0 grams of deionized water, 40.0 grams of a 30% solution of C10-C12 fatty alcohol (POE 15) Ammonium Sulfate (Abex® JKB), and 7.9 grams of DSP (POE 40) were added to the reaction kettle and agitation was commenced. Oxygen was removed from the solution by nitrogen sparge and the solution was heated to 65° C. Next a monomer mixture of 288.0 g styrene, 210.0 g of ethyl acrylate and 26.0 g of methacrylic acid was prepared. 52.4 g (10%) of the monomer mixture was charged to the reaction kettle. A catalyst solution consisting of 5.0 g potassium persulfate in 100.0 g deionized water was then prepared and 10% of the catalyst solution was then charged to the reaction kettle. A trace of ferrous sulfate was then added. The reaction mixture exothermed to 70-75° C. The remaining monomer mixture and catalyst solution were then metered in to the reaction kettle over a period of four hours. During the addition, the temperature of the reaction was maintained at 80° C. After the addition of monomer and catalyst was complete, the reaction mixture was held at 80° C. for an additional 30 minutes. The reaction mixture was then cooled to 40° C. and 8 grams of ammonium hydroxide in 20 mL deionized water was added slowly to the reaction kettle. After stirring for an additional 15 minutes, the emulsion was filtered through a 150 micron filter bag. The emulsion properties are shown in Table 6.

TABLE 6

| Emulsion | Properties |
|---|---|
| Solids | 39.4 |
| pH | 8.7 |
| Coagulum | <0.2% |
| Viscosity (centipoise) | 20 |
| Mean Particle Size (nm) | 79.5 |
| Polydispersity Index | 0.094 |
| Mechanical Stability | Good |
| Chemical Stability* | Good |

*1M CaCl$_2$

The properties of the styrene acrylic emulsions in example 3 and example 4 again demonstrate the usefulness of the present invention. The Styrenated Phenol Ethoxylates yielded emulsions with smaller particle size compared to the emulsion synthesized using the conventional polymerization surfactants.

The following additional examples further illustrate the usefulness of the invention. The surfactants of the present invention again yielded emulsions with smaller particle size compared with the emulsion prepared using the conventional surfactant combination of Nonylphenol (POE 30) Ammonium Sulfate and Octylphenol (POE 40).

Example 5

687.0 grams of deionized water, 50.0 grams of a 30% solution of DSP (POE 40) Ammonium Sulfate, and 15.0 grams of DSP (POE 40) were added to the reaction kettle and agitation was commenced. Oxygen was removed from the solution by nitrogen sparge and the solution was heated to 65° C. Next a monomer mixture of 134.4 g methyl methacrylate, 532.0 g of butyl acrylate and 6.0 g of methacrylic acid was prepared. 67.0 g (10%) of the monomer mixture was charged to the reaction kettle. A catalyst solution consisting of 5.0 g potassium persulfate in 100.0 g deionized water was then prepared and 10% of the catalyst solution was then charged to the reaction kettle. A trace of ferrous sulfate was then added.

The reaction mixture exothermed to 70-75° C. The remaining monomer mixture and catalyst solution were then metered in to the reaction kettle over a period of two hours. During the addition, the temperature of the reaction was maintained between 70-75° C. After the addition of monomer and catalyst was complete, the reaction mixture was held at 70-75° C. for an additional 30 minutes. The reaction mixture was then cooled to 40° C. and 4 grams of ammonium hydroxide in 20 mL deionized water was added slowly to the reaction kettle. After stirring for an additional 15 minutes, the emulsion was filtered through a 150 micron filter bag. The emulsion properties are shown in Table 7.

TABLE 7

| Emulsion | Properties |
| --- | --- |
| Solids | 45.6 |
| pH | 8.5 |
| Coagulum | <0.1% |
| Viscosity (centipoise) | 140 |
| Mean Particle Size (nm) | 125.7 |
| Polydispersity Index | 0.032 |
| Mechanical Stability | Good |
| Chemical Stability* | Good |

*1M $CaCl_2$

Comparative Example 3

687.0 grams of deionized water, 50.0 grams of a 30% solution of Nonylphenol (POE 30) Ammonium Sulfate (Abex® EP-120), and 18.7 grams of an 80% solution of Octylphenol (POE 40) (Triton® X-405) were added to the reaction kettle and agitation was commenced. Oxygen was removed from the solution by nitrogen sparge and the solution was heated to 65° C. Next a monomer mixture of 134.4 g methyl methacrylate, 532.0 g of butyl acrylate and 6.0 g of methacrylic acid was prepared. 67.0 g (10%) of the monomer mixture was charged to the reaction kettle. A catalyst solution consisting of 5.0 g potassium persulfate in 100.0 g deionized water was then prepared and 10% of the catalyst solution was then charged to the reaction kettle. A trace of ferrous sulfate was then added. The reaction mixture exothermed to 70-75° C. The remaining monomer mixture and catalyst solution were then metered in to the reaction kettle over a period of two hours. During the addition, the temperature of the reaction was maintained between 70-75° C. After the addition of monomer and catalyst was complete, the reaction mixture was held at 70-75° C. for an additional 30 minutes. The reaction mixture was then cooled to 40° C. and 4 grams of ammonium hydroxide in 20 mL deionized water was added slowly to the reaction kettle. After stirring for an additional 15 minutes, the emulsion was filtered through a 150 micron filter bag. The emulsion properties are shown in Table 8.

TABLE 8

| Emulsion | Properties |
| --- | --- |
| Solids | 45.6 |
| pH | 8.7 |
| Coagulum | <0.1% |
| Viscosity (centipoise) | 110 |
| Mean Particle Size (nm) | 131.2 |
| Polydispersity Index | 0.040 |
| Mechanical Stability | Good |
| Chemical Stability* | Good |

*1M $CaCl_2$

Example 6

687.0 grams of deionized water, 50.0 grams of a 30% solution of Nonylphenol (POE 30) Ammonium Sulfate (Abex® EP-120), and 15.0 grams of DSP (POE 40) were added to the reaction kettle and agitation was commenced. Oxygen was removed from the solution by nitrogen sparge and the solution was heated to 65° C. Next a monomer mixture of 134.4 g methyl methacrylate, 532.0 g of butyl acrylate and 6.0 g of methacrylic acid was prepared. 67.0 g (10%) of the monomer mixture was charged to the reaction kettle. A catalyst solution consisting of 5.0 g potassium persulfate in 100.0 g deionized water was then prepared and 10% of the catalyst solution was then charged to the reaction kettle. A trace of ferrous sulfate was then added. The reaction mixture exothermed to 70-75° C. The remaining monomer mixture and catalyst solution were then metered in to the reaction kettle over a period of two hours. During the addition, the temperature of the reaction was maintained between 70-75° C. After the addition of monomer and catalyst was complete, the reaction mixture was held at 70-75° C. for an additional 30 minutes. The reaction mixture was then cooled to 40° C. and 4 grams of ammonium hydroxide in 20 mL deionized water was added slowly to the reaction kettle. After stirring for an additional 15 minutes, the emulsion was filtered through a 150 micron filter bag. The emulsion properties are shown in Table 9.

TABLE 9

| Emulsion | Properties |
| --- | --- |
| Solids | 45.3 |
| pH | 8.3 |
| Coagulum | <0.1% |
| Viscosity (centipoise) | 280 |
| Mean Particle Size (nm) | 116.4 |
| Polydispersity Index | 0.040 |
| Mechanical Stability | Good |
| Chemical Stability* | Good |

*1M $CaCl_2$

All patents, patent applications and publications cited in this application including all cited references in those applications, are hereby incorporated by reference in their entirety for all purposes to the same extent as if each individual patent, patent application or publication were so individually denoted.

While the many embodiments of the invention have been disclosed above and include presently preferred embodiments, many other embodiments and variations are possible within the scope of the present disclosure and in the appended claims that follow. Accordingly, the details of the preferred embodiments and examples provided are not to be construed as limiting. It is to be understood that the terms used herein are merely descriptive rather than limiting and that various changes, numerous equivalents may be made without departing from the spirit or scope of the claimed invention.

What is claimed is:

1. A process for the emulsion polymerization of at least one ethylenically unsaturated monomer containing at least one carbon-to-carbon double bond, said process comprising polymerizing said at least one ethylenically unsaturated monomer in an aqueous medium in the presence of a water-soluble initiator and a mixture consisting of surfactants of formula I and formula II:

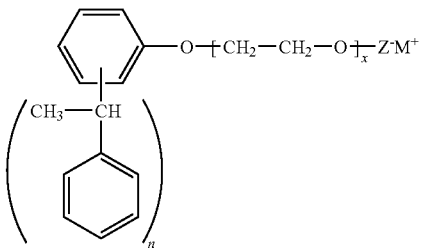

wherein n =1, 2 or 3; x is 1-100; $Z^-$ is selected from the group consisting of $SO_3^-$ and $PO_3^{2-}$, and $M^+$ is $Na^+$, $K^+$, $NH_4^+$, or an alkanolamine.

2. The process of claim 1, wherein said ethylenically unsaturated monomer is selected from the group consisting of vinyl acetate, vinyl propionate, vinyl benzoate, styrene, methyl styrene, vinyl toluene, vinyl naphthalene, divinyl benzene, vinyl chloride, vinylidene chloride, acrylic acid, methacrylic acid, acrylamide, acrylonitrile, methyl acrylate, methyl methacrylate, ethyl acrylate, propyl acrylate, butyl acrylate, ethyl methacrylate, propyl methacrylate, butyl methacrylate, benzyl acrylate, benzyl methacrylate, cyclohexyl acrylate, cyclohexyl methacrylate, decyl acrylate, dodecyl acrylate, decyl methacrylate, dodecyl methacrylate, hydroxypropyl acrylate, hydroxyethyl acrylate, hydroxypropyl methacrylate, hydroxyethyl methacrylate, amino acrylates, and amino methacrylates.

3. The process of claim 1, wherein x is 5 to 60.

4. The process of claim 1, wherein x is 5 to 40.

* * * * *